United States Patent
Liu et al.

(10) Patent No.: US 11,092,061 B2
(45) Date of Patent: Aug. 17, 2021

(54) PULSE EXHAUST PIPE AND DIESEL ENGINE INSTALLED WITH PULSE EXHAUST PIPE

(71) Applicant: Weichai Power Co., Ltd., Weifang (CN)

(72) Inventors: Junlong Liu, Weifang (CN); Zhijie Li, Weifang (CN); Xiaojun Yin, Weifang (CN); Chunying Wang, Weifang (CN)

(73) Assignee: Weichai Power Co., Ltd., Weifang (CN)

( * ) Notice: Subject to any disclaimer, the term of this patent is extended or adjusted under 35 U.S.C. 154(b) by 139 days.

(21) Appl. No.: 16/484,686

(22) PCT Filed: Nov. 2, 2017

(86) PCT No.: PCT/CN2017/109176
§ 371 (c)(1),
(2) Date: Aug. 8, 2019

(87) PCT Pub. No.: WO2018/145492
PCT Pub. Date: Aug. 16, 2018

(65) Prior Publication Data
US 2020/0102877 A1    Apr. 2, 2020

(30) Foreign Application Priority Data
Feb. 9, 2017 (CN) .......................... 201720118674.0

(51) Int. Cl.
*F01N 13/10* (2010.01)
*F01N 13/00* (2010.01)
(Continued)

(52) U.S. Cl.
CPC ........... *F01N 13/10* (2013.01); *F01N 13/002* (2013.01); *F01N 13/107* (2013.01);
(Continued)

(58) Field of Classification Search
CPC .... F02B 37/001; F02B 37/007; F02B 37/025; F01N 13/107; F01N 2260/06; F01N 2260/16; F01N 2340/06; F01N 2470/14
See application file for complete search history.

(56) References Cited

U.S. PATENT DOCUMENTS 3,618,313 A    11/1971   Zehnder

FOREIGN PATENT DOCUMENTS

| CH | 176717 A | * | 4/1935 | ............ F02B 37/007 |
| CN | 101070776 A |  | 11/2007 |  |

(Continued)

OTHER PUBLICATIONS

International Search Report dated Feb. 2, 2018 in corresponding International Application No. PCT/CN2017/109176; 7 pages.
(Continued)

*Primary Examiner* — Laert Dounis
(74) *Attorney, Agent, or Firm* — Maier & Maier, PLLC

(57) ABSTRACT

A pulse exhaust pipe for use with diesel engines an end of the pulse exhaust pipe is in communication with eight cylinders, and another end is in communication with two turbochargers; the pulse exhaust pipe includes three exhaust pipe sections which are separated from each other, each exhaust pipe section discharging to a turbocharger independently, wherein a first exhaust pipe section is in communication with a first and second cylinder, while a second exhaust pipe section is in communication with a third to a sixth cylinder, and a third exhaust pipe section is in communication with a seventh and eighth cylinder. The pulse exhaust pipe may prevent the backward flow of exhaust gas and inlet air back flow, thus increasing inflation efficiency and improving the uniformity of each cylinder. Also provided is a diesel engine installed with said pulse exhaust pipe.

4 Claims, 3 Drawing Sheets

(51) Int. Cl.
 F02B 37/02 (2006.01)
 F02B 37/00 (2006.01)
(52) U.S. Cl.
 CPC ......... *F02B 37/001* (2013.01); *F02B 37/025* (2013.01); *F01N 2260/06* (2013.01); *F01N 2260/16* (2013.01); *F01N 2340/06* (2013.01); *F01N 2470/00* (2013.01); *F01N 2470/14* (2013.01); *Y02T 10/12* (2013.01)

(56) References Cited

FOREIGN PATENT DOCUMENTS

| CN | 200999652 Y | | 1/2008 | |
|----|----|----|----|----|
| CN | 201843679 U | | 5/2011 | |
| CN | 103644022 A | | 3/2014 | |
| CN | 108894872 A | * | 11/2018 | |
| DE | 650569 C | * | 9/1937 | ............. F02B 37/02 |
| DE | 2719668 A1 | * | 11/1978 | ........... F02D 23/005 |
| DE | 10 2006 042 443 A1 | | 3/2008 | |
| EP | 0356378 A2 | | 2/1990 | |
| GB | 336094 A | * | 10/1930 | ............ F02B 37/007 |
| GB | 401152 A | * | 11/1933 | ............. F02B 37/02 |
| GB | 1 217 045 A | | 12/1970 | |

OTHER PUBLICATIONS

Extended European Search Report dated May 29, 2020, including the Supplementary European Search Report and the European Search Opinion, in connection with corresponding EP Application No. 17896027.4 (5 pgs.).

\* cited by examiner

PULSE EXHAUST PIPE AND DIESEL ENGINE INSTALLED WITH PULSE EXHAUST PIPE

FIELD

The present disclosure relates to the technical field of exhaust supercharging of diesel engines, and in particular, to a pulse exhaust pipe for a diesel engine.

BACKGROUND

Exhaust pipes for eight-cylinder matched double-supercharger engines in the prior art mainly include a common pulse exhaust pipe as shown in FIG. 1 and a three-cylinder pulse exhaust pipe as shown in FIG. 2. The common pulse exhaust pipe is relatively high in pumping loss and relatively high in fuel consumption rate due to the ignition order. The pulse energy utilization rate is increased and the pumping loss is reduced by improving the common pulse exhaust pipe, the three-cylinder pulse exhaust pipe in the prior art is provided, and a connected structure of the three-cylinder pulse exhaust pipe is shown in FIG. 2. However, the three-cylinder pulse exhaust pipe is prone to backflow of exhaust gas and backflow of intake air, so the uniformity of each cylinder is relatively low. If the phenomenon of the backflow of exhaust gas occurs in the exhaust pipe, the pulse energy utilization rate is relatively low, and the uniformity of each cylinder needs to be improved.

In a multi-cylinder engine, an ignition interval angle between the various cylinders shall be smaller than an exhaust duration angle. In order to avoid mutual interference of gas exhausting of adjacent cylinders, it is necessary to branch the exhaust pipe, that is, the exhaust pipe is divided into several mutually separated exhaust pipe sections such that adjacent cylinders discharge to a supercharger through different exhaust pipe sections, i.e. different exhaust passages. The exhaust phases of the respective cylinders connected to each exhaust pipe section must not be superposed or are superposed a little. For a four-stroke diesel engine, the opening duration angle of its exhaust valve approximately corresponds to a stroke from a cam angle of 240 degrees to a cam angle of 280 degrees. The number of cylinders connected to each exhaust pipe section is generally not more than three, and the exhaust phases of the three cylinders must be uniformly staggered. In order to avoid the interference, it is preferable that an exhaust interval angle of two cylinders discharging to the same exhaust pipe section is equal to or greater than the exhaust duration angle of one of the cylinders, that is, after the exhaust valve of the previous cylinder is closed, the next cylinder then discharges to the exhaust pipe section. The exhaust interval angle of the multi-cylinder engine is decreased as the number of cylinders increases, so that the structure is too complicated because of the increased number of exhaust pipe sections on the multi-cylinder engine. In addition, an exhaust interruption may occur in the exhaust pipe, which reduces the efficiency of a turbine. The exhaust pipe used also needs to avoid the occurrence of the backflow of the exhaust gas.

The present disclosure applies a 16-cylinder V-shaped engine equipped with four superchargers. The cylinders are sorted as shown in FIG. 3. The ignition order is A1-A7-B4-B6-A4-B8-A2-A8-B3-B5-A3-A5-B2-A6-B1-B7, and the ignition interval angle is 45 degrees.

The performances of the common pulse exhaust pipe and the three-cylinder pulse exhaust pipe in the prior art are compared, and results are as shown in Table 1 below:

TABLE 1

| | Comparison of exhaust pipes of two forms | | | | | | | | | |
|---|---|---|---|---|---|---|---|---|---|---|
| | Rotating speed rpm | Fuel consumption rate g/kWh | Explosion pressure bar | Air flow kg/s | Pressure in front of the turbine bar | Temperature in front of the turbine ° C. | Temperature behind the turbine ° C. | Pumping power bar | Turbine efficiency % | Charge efficiency | Coefficient of residual gas |
| Common pulse arrangement form | 1500 | 206.3 | 160 | 0.472 | 2.34 | 644 | 563 | −0.70 | 62.5 | 0.8975 | 0.0208 |
| Three-cylinder pulse arrangement form | 1500 | 201.8 | 161 | 0.466 | 2.33 | 681 | 547 | −0.32 | 65.4 | 0.9318 | 0.0252 |

By the comparison of the performance data of the exhaust pipes of two structures in Table 1, the three-cylinder pulse exhaust pipe compared to the common exhaust pipe has the advantages that the utilization rate of exhaust pulse energy is higher, the pumping loss is reduced, the charge efficiency is improved, and the fuel consumption is reduced.

However, for an exhaust pipe in the three-cylinder pulse arrangement form, the phenomena of the backflow of exhaust gas and the backflow of intake air occur in the second and sixth cylinders. As shown in FIG. 6, by the analysis of the ignition order of the eight cylinders (A1 to A8) on the side A, the exhaust interval angle of the two cylinders A6 and A7 is 180 degrees, and the exhaust interval angle of the two cylinders A2 and A3 is also 180 degrees. When the discharging of the second and sixth cylinders is to be ended, the third and seventh cylinders just discharge, and then the exhaust gas of the second and sixth cylinders flow back, which causes the pressure in the cylinder to be greater than the pressure of an air inlet when an air inlet valve is opened and results in the backflow of the intake air.

In addition, by analyzing a temperature distribution cloud chart of the exhaust pipe in the three-cylinder pulse arrangement form, it can be seen that the temperatures of outlets of the exhaust pipe sections communicated with three cylinders and located at two ends are higher than the temperature of an outlet of the middle pipe section communicated with two cylinders, which causes easy cracking and deformation of a partition plate at an outlet of the exhaust pipe and reduces the reliability of the exhaust pipe.

SUMMARY

The objective of the present disclosure is to solve the following technical problems by discussing what kind of pulse exhaust pipes adopted by an eight-cylinder matched double-supercharger engine may optimize the reliability, the economy and the manufacturability of the engine, that is, by discussing how to effective make use of exhaust pulse energy to reduce the exhaust pumping loss, achieve the aim of reducing the fuel consumption and also avoid backflow of exhaust gas and backflow of intake air due to a relatively short ignition interval of adjacent cylinders, thereby increasing the charge efficiency of the engine, improving the uniformity of each cylinder and the uniformity of an exhaust temperature distribution, reducing deformation or cracking caused by non-uniform distribution of stress on a partition at an outlet of the exhaust pipe and improving the reliability of the exhaust pipe. The objective of the present disclosure is achieved by the following technical solution.

The present disclosure provides a pulse exhaust pipe for a diesel engine. One end of the pulse exhaust pipe is communicated with eight cylinders, and the other end of the pulse exhaust pipe is communicated with two superchargers. The pulse exhaust pipe includes three mutually separated exhaust pipe sections. The respective exhaust pipe sections independently discharge to the superchargers. The first exhaust pipe section is communicated with the first and second cylinders. The second exhaust pipe section is communicated with the third to sixth cylinders. The third exhaust pipe section is communicated with the seventh and eighth cylinders.

The present disclosure further provides a diesel engine equipped with the above pulse exhaust pipe.

The diesel engine is an eight-cylinder diesel engine or a 16-cylinder V-shaped diesel engine.

Compared with a common pulse exhaust pipe, the exhaust pipe of the present disclosure may reduce the pumping loss, improve the efficiency of a turbine, enhance effective utilization of exhaust energy and reduce fuel consumption.

In addition, compared with a three-cylinder pulse exhaust pipe, the exhaust pipe of the pressure disclosure may avoid the occurrence of phenomena of backflow of exhaust gas and backflow of intake air, increase the charge efficiency and improve the uniformity of each cylinder.

Compared with the three-cylinder pulse exhaust pipe, the exhaust pipe of the pressure disclosure is more uniform in temperature distribution, thereby avoiding cracking or deformation of a partition at an outlet of the exhaust pipe due to non-uniform temperature distribution and improving the reliability of the exhaust pipe.

BRIEF DESCRIPTION OF THE DRAWINGS

Various other advantages and benefits will become apparent to those skilled in the art by reading the detailed descriptions of preferred embodiments below. The accompanying drawings are only for the purpose of illustrating the preferred embodiments and are not intended to limit the present disclosure. Throughout the drawings, the same reference numerals are used to refer to the same elements. In the drawings.

DETAILED DESCRIPTION

Figure 1:
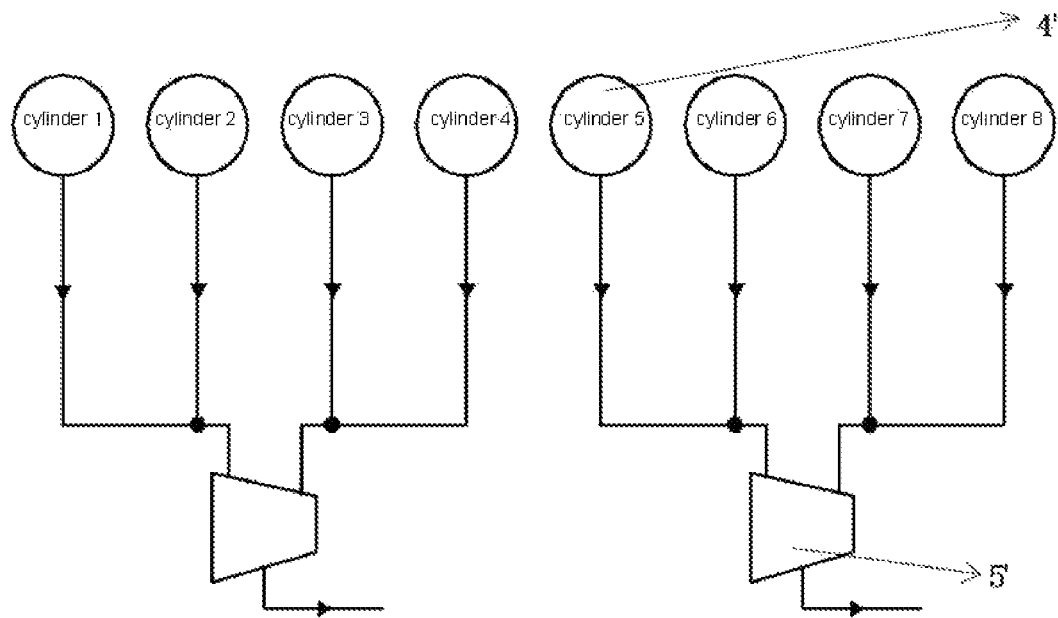
FIG. 1 schematically shows an arrangement form of a common pulse exhaust pipe in the prior art.
Figure 2:
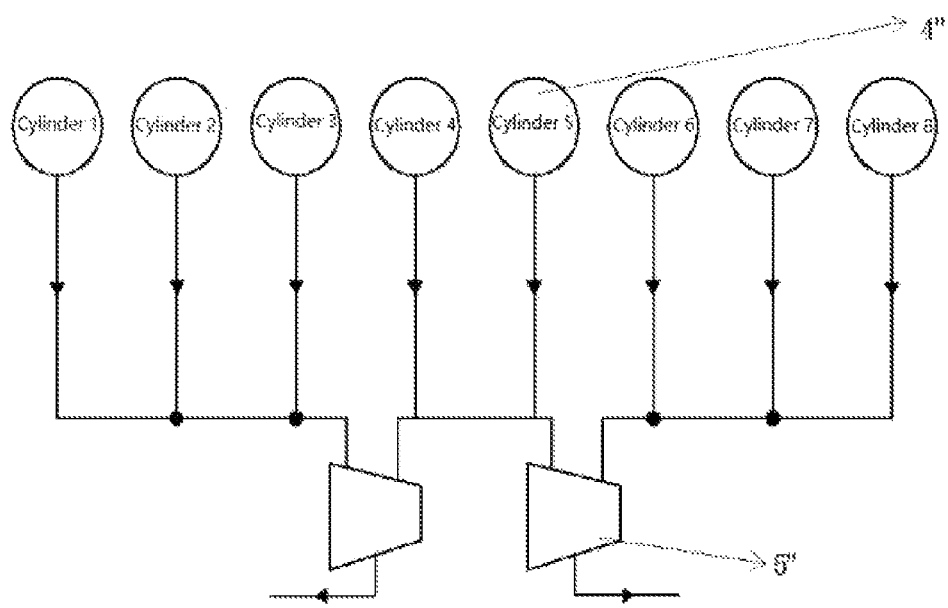
FIG. 2 schematically shows an arrangement form of a three-cylinder pulse exhaust pipe in the prior art.
Figure 3:
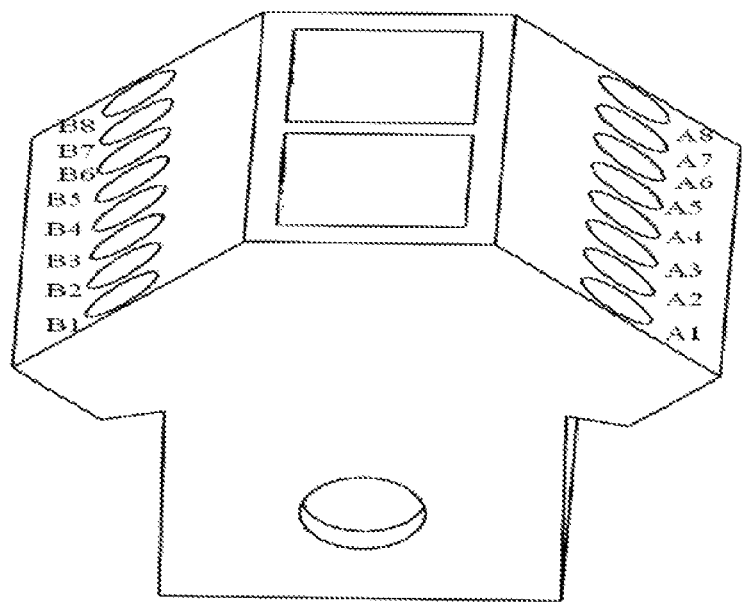
FIG. 3 schematically shows a cylinder distribution diagram of a diesel engine applying a pulse exhaust pipe of the present disclosure.

Exemplary embodiments of the present disclosure will be described in more detail below with reference to the accompanying drawings. Although the exemplary embodiments of the present disclosure are shown in the drawings, it should be understood that the present disclosure may be embodied in various forms and not limited by the embodiments described herein. On the contrary, these embodiments are provided to fully understand the present disclosure, and the scope of the present disclosure can be fully sent to those skilled in the art.

Figure 4:
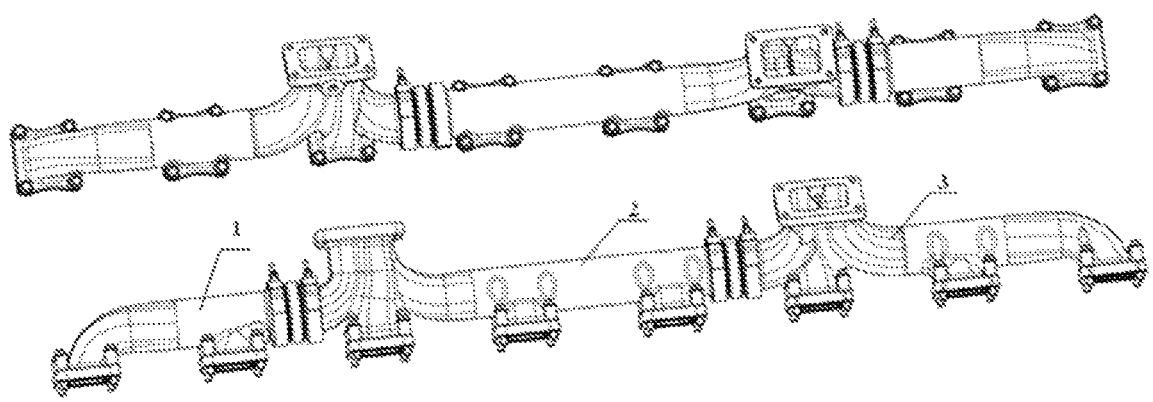
FIG. 4 schematically shows a three-dimensional structure of a pulse exhaust pipe according to the embodiment of the present disclosure.
Figure 5:
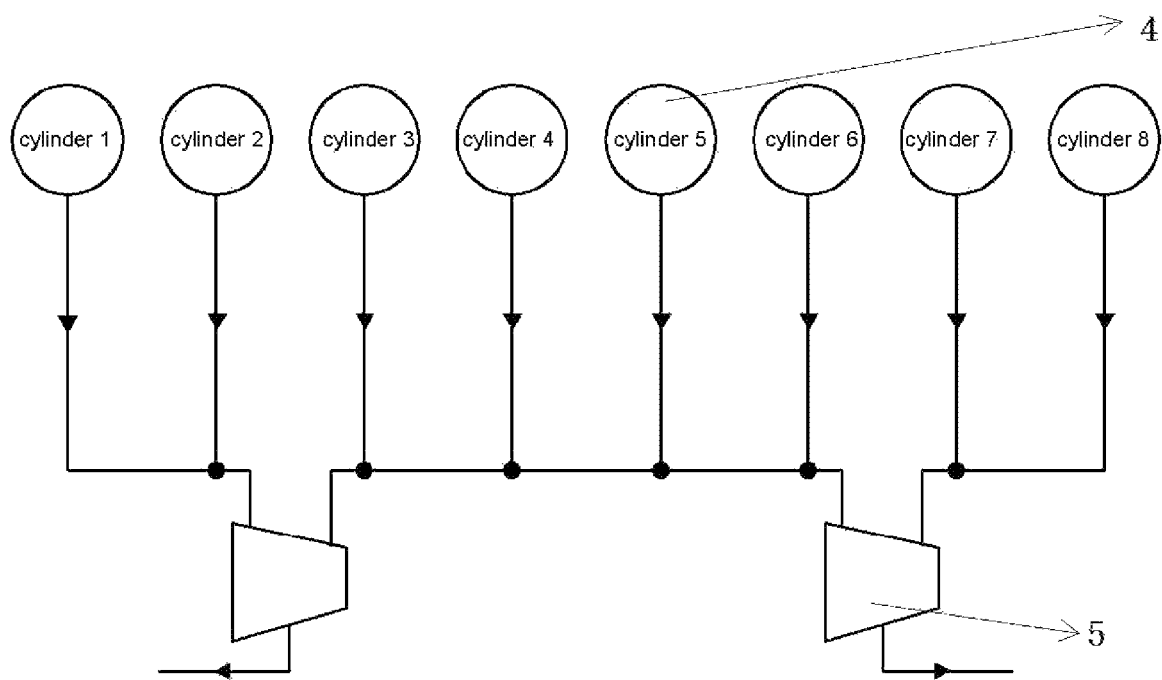
FIG. 5 schematically shows an arrangement form of a pulse exhaust pipe according to the embodiment of the present disclosure.

As shown in FIGS. 4 and 5, according to the exemplary embodiment of the present disclosure, a pulse exhaust pipe for a diesel engine is provided. The diesel engine is an eight-cylinder diesel engine or a 16-cylinder V-shaped diesel engine. Every eight cylinders are matched with two superchargers through the pulse exhaust pipe. One end of the pulse exhaust pipe of the present disclosure is communicated with eight cylinders 4, and the other end of the pulse exhaust pipe is communicated with two superchargers 5. The pulse exhaust pipe includes three mutually separated exhaust pipe sections, namely a first exhaust pipe section or front exhaust pipe section 1, a second exhaust pipe section or middle exhaust pipe section 2 and a third exhaust pipe section or rear exhaust pipe section 3. The interior of each exhaust pipe section has an integrally communicated exhaust cavity. The first exhaust pipe section 1 is communicated with the first and second cylinders; the second exhaust pipe section 2 is communicated with the third to sixth cylinders; and the third exhaust pipe section 3 is communicated with the seventh and eighth cylinders. Each of the exhaust pipe sections independently discharge to the superchargers. Specifically, the first exhaust pipe section and the third exhaust pipe respectively discharge to the first supercharger and the second supercharger through single exhaust ports. The second exhaust pipe discharges to the first supercharger and the second supercharger respectively through two exhaust ports located at both ends. The exhaust ports of the first exhaust pipe and the second exhaust pipe for discharging to the first supercharger are separated and do not affect each other. Similarly, the exhaust ports of the second exhaust pipe and the third exhaust pipe for discharging to the second supercharger are separated. That is, the first and second cylinders have a shared exhaust passage, the third to sixth cylinders have a shared exhaust passage, and the seventh and eighth cylinders have a shared exhaust passage.

Based on the above, compared with the prior art, the arrangement mode of the present disclosure is to respectively separate the second cylinder from the third cylinder as well as separate the sixth cylinder from the seventh cylinder on the basis of a three-cylinder pulse exhaust pipe in the prior art. That is, the second cylinder and the third cylinder discharge the gas through different exhaust pipe sections or exhaust passages, and the sixth cylinder and the seventh cylinder discharge the gas through different exhaust pipe sections or exhaust passages. Furthermore, a difference from an common pulse exhaust pipe in the prior art is that the fourth cylinder and the fifth cylinder discharge to the shared exhaust pipe section through the middle exhaust pipe section 2, namely the third, fourth, fifth and sixth cylinders all discharge to the superchargers through the middle exhaust pipe section.

Figure 6:
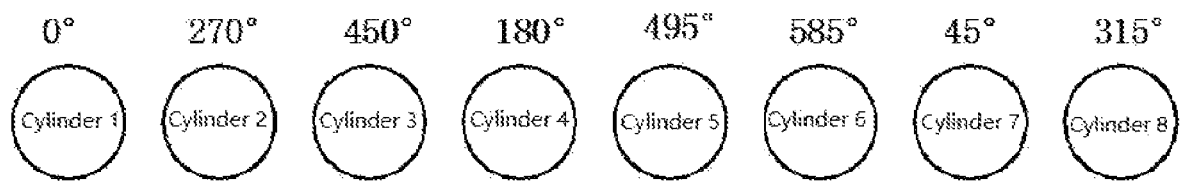
FIG. 6 schematically shows an ignition angle of each cylinder of a diesel engine applying a pulse exhaust pipe of the present disclosure.

It can be seen from the above descriptions of the causes of the disadvantages of the prior art that the sectioning form of the exhaust pipe of the present disclosure may well avoid the phenomena of backflow of exhaust gas and backflow of intake air according to the exhaust phase of each cylinder, and may utilize the exhaust pulse energy more fully. According to the ignition order A1-A7-B4-B6-A4-B8-A2-A8-B3-B5-A3-A5-B2-A6-B1-B7 as described above, the ignition interval angle is 45 degrees. Only the ignition order of the cylinders A1 to A8 is described. It can be seen from FIG. 6 that the exhaust interval angles between the second cylinder and the third cylinder as well as between the sixth cylinder and the seventh cylinder are both 180 degrees. According to the exhaust pipe arrangement form of the present disclosure, the second cylinder and the third cylinder discharge through different exhaust pipe sections or exhaust passages, and the sixth cylinder and the seventh cylinder discharge through different exhaust pipe sections or exhaust passages. Therefore, there is no exhaust interference.

Through the above embodiment, the present disclosure may achieve the following advantages:

1. Compared with a common pulse exhaust pipe, the pulse exhaust pipe may reduce the pumping loss, improve the efficiency of a turbine, enhance the effective utilization of exhaust energy and reduce the fuel consumption; and 2. Compared with a three-cylinder pulse exhaust pipe, the pulse exhaust pipe may avoid backflow of exhaust gas and backflow of intake air and improve the charge efficiency and the uniformity of each cylinder.

The above is only a preferred embodiment of the present disclosure, but the protection scope of the present disclosure is not limited thereto. Changes or replacements that are easily considered by any person skilled in the art within the technical scope disclosed by the present disclosure shall all fall within the protection scope of the present disclosure. Therefore, the protection scope of the present disclosure shall be determined by the protection scope of the claims.

The invention claimed is:

1. A pulse exhaust pipe for a diesel engine, comprising: a first end of the pulse exhaust pipe is communicated with eight cylinders, and a second end of the pulse exhaust pipe is communicated with two superchargers; the pulse exhaust pipe comprising three mutually separated exhaust pipe sections; the respective exhaust pipe sections independently discharge to the superchargers; a first exhaust pipe section of the exhaust pipe sections is communicated with first and second cylinders of the eight cylinders; a second exhaust pipe section of the exhaust pipe sections is communicated with third to sixth cylinders of the eight cylinders; and a third exhaust pipe section of the exhaust pipe sections is communicated with the seventh and eighth cylinders of the eight cylinders.

2. A diesel engine, wherein the diesel engine is equipped with the pulse exhaust pipe according to claim 1.

3. The diesel engine according to claim 2, wherein the diesel engine is an eight-cylinder diesel engine.

4. The diesel engine according to claim 2, wherein the diesel engine is a 16-cylinder V-shaped diesel engine.

\* \* \* \* \*